United States Patent
Mannhalter et al.

(10) Patent No.: US 11,951,696 B2
(45) Date of Patent: Apr. 9, 2024

(54) METHOD FOR COMPRESSION MOLDING COSMETIC COMPOSITE PARTS

(71) Applicant: Arris Composites Inc., Berkeley, CA (US)

(72) Inventors: Bert D. Mannhalter, Kensington, CA (US); J. Scott Perkins, Oakland, CA (US); Allison R. Light, Orinda, CA (US); Ian Graham, Oakland, CA (US); Joe Wong, Livermore, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 69 days.

(21) Appl. No.: 17/572,445

(22) Filed: Jan. 10, 2022

(65) Prior Publication Data

US 2022/0219409 A1 Jul. 14, 2022

Related U.S. Application Data

(60) Provisional application No. 63/135,390, filed on Jan. 8, 2021.

(51) Int. Cl.
*B29C 70/34* (2006.01)
*B29B 11/06* (2006.01)
*B29B 11/10* (2006.01)
*B33Y 80/00* (2015.01)

(52) U.S. Cl.
CPC ............ *B29C 70/345* (2013.01); *B29B 11/06* (2013.01); *B29B 11/10* (2013.01); *B33Y 80/00* (2014.12)

(58) Field of Classification Search
CPC ... B29C 70/345; B29C 43/003; B29C 43/203; B29C 70/086; B29C 70/34; B29C 43/146; B29C 43/14; B29C 43/26; B29C 43/30; B29C 43/265; B29C 66/73122; B29B 11/06; B29B 11/10; B29B 11/12; B33Y 80/00

See application file for complete search history.

(56) References Cited

U.S. PATENT DOCUMENTS

| | | | |
|---|---|---|---|
| 2012/0119404 A1* | 5/2012 | Wallace | B32B 38/12 264/322 |
| 2017/0106610 A1* | 4/2017 | Manera | B29C 70/345 |
| 2018/0370096 A1* | 12/2018 | Fuchs | B29C 45/73 |

FOREIGN PATENT DOCUMENTS

EP  2345528 B1 * 1/2016 ........... B29C 70/086

* cited by examiner

*Primary Examiner* — S. Behrooz Ghorishi
(74) *Attorney, Agent, or Firm* — Kaplan Breyer Schwarz, LLP

(57) ABSTRACT

A cosmetic part is formed via compression molding in a single molding operation with no post processing by forming an assemblage of feed constituents, wherein the assemblage includes plural fiber-bundle-based preforms and one or more resin-only constituents, the latter configured and positioned as appropriate to create resin-rich cosmetic layers where desired on the part.

14 Claims, 2 Drawing Sheets

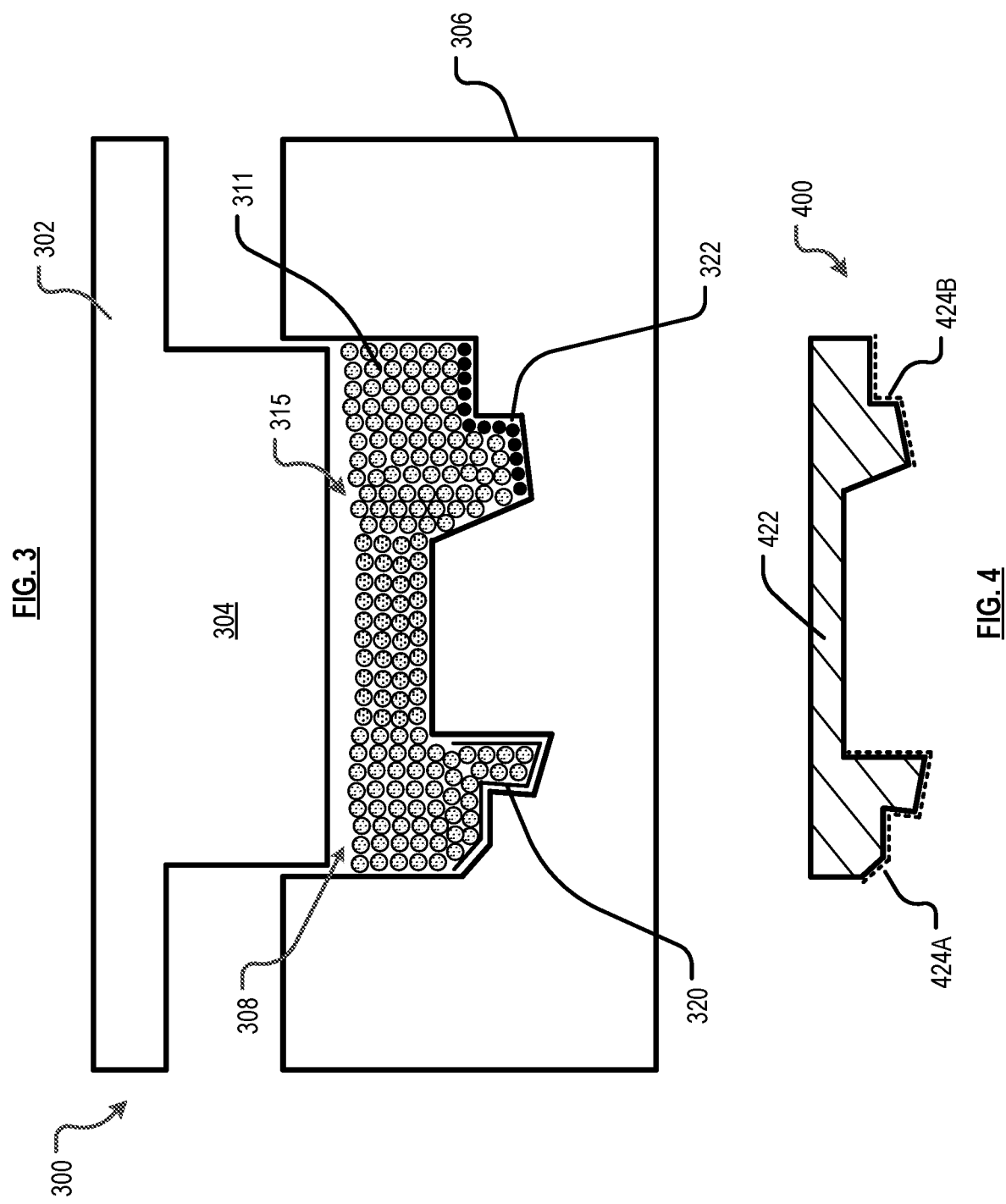

METHOD FOR COMPRESSION MOLDING COSMETIC COMPOSITE PARTS

STATEMENT OF RELATED CASES

This specification claims priority to U.S. Pat. App. Ser. No. 63/135,390, filed Jan. 8, 2021 and which is incorporated by reference herein.

FIELD OF THE INVENTION

The present invention relates to the manufacture of fiber-composite parts.

BACKGROUND

Certain applications for composite parts present stringent aesthetic requirements. Although composite parts offer many performance benefits, the presence therein of dissimilar constituent materials—fibers and resin—can result in an inconsistent surface aesthetic. In particular, fibers may be visible at the surface of a composite part, and the presence of such visible fibers will often not meet cosmetic specifications for the part.

There are methods for manufacturing a composite part having one or more surfaces that are free of visible fibers (hereinafter "a cosmetic composite part"). This typically involves post processing, wherein painting, polishing, and like techniques are used to hide fibers on aesthetic/cosmetic surfaces. Methods in which such a part is capable of meeting specifications "as molded" (i.e., directly out of the mold with no post processing) are far fewer, and tend to be cost prohibitive, and limited in process latitude. Specifically, these processes require multiple molding runs using different molding tools, and are limited to injection molding.

Historically, the primary approach for achieving such a cosmetic composite part is via "injection overmolding." In this process, a part is first molded, and is then subjected to a second injection-molding cycle. The second cycle uses a molding tool that is slightly larger than the part, and in particular provides a gap between the part's cosmetic surfaces and the tool. Resin is injected into the gap, thus covering the visible fibers on relevant surfaces.

Although a part produced via the applicant's compression-molding processes could be overmolded in this manner, the added cost of an injection mold and further processing is undesirable. The art would therefore benefit from a compression molding process that is capable of producing a cosmetic composite part as part of the compression molding process itself; that is, via a single-step process and without post processing.

SUMMARY

The present invention provides a method for creating a cosmetic composite part that does not sacrifice mechanical performance, wherein the part is fabricated in a single compression-molding operation and without post processing to produce cosmetic surfaces.

As noted in the Background, prior methods for creating cosmetic composite parts require multiple molds and/or multiple processing steps (i.e., overmolding), or post processing. Embodiments of the invention avoid such complications by creating a resinous, fiber-free surface layer during the molding process. In accordance with the present teachings, this surface layer is created via a compression molding process by: (i) adding a resinous, fiber-free feed constituent to the fiber-composite feed constituents, (ii) operating the compression molding process to create a differential viscosity between the resin in resinous feed constituent and the resin in the fiber-composite feed constituents, and (iii) operating the compression molding process to create a differential consolidation between the aforementioned resins.

The resin-only constituent is incorporated into the assemblage of fiber-composite feed constituents (typically fiber-bundle-based preforms) in the form of either: (i) a thermoformed layer, (ii) a 3D-printed layer, or (iii) neat resin-filament subunits, or any combination thereof. The placement/geometry of the resin-only constituent in the assemblage is determined by the desired aesthetic surfaces of the part.

In some embodiments, a viscosity modifier is added to the resin-only constituent(s) to increase its nominal viscosity. Alternatively (or in addition to), a viscosity modifier is added to the resin in the fiber-composite feed constituent(s) to decrease its nominal viscosity. In addition to any viscosity modification via additives, the compression molding process is carried out in such a manner that the resin-only constituent is maintained at a lower temperature than fiber-composite feed constituent(s) until the latter is consolidated at appropriate temperature and pressure. After the fiber-composite feed constituent(s) is consolidated, the temperature of the resin-only constituent is raised and pressure applied to consolidate the resin-only constituent, however minimally. This ensures that the resin-only constituent forms a consistent, cosmetic layer where desired on the molded part.

Some embodiments of the invention provide a method for forming, via compression molding in a single molding operation, a fiber-composite part having at least one cosmetic surface, wherein the cosmetic surface is formed without post processing, wherein the method comprises:

forming an assemblage of feed constituents, wherein the assemblage includes:
a. a plurality of fiber-bundle-based preforms, each preform comprising a plurality of fibers infused with a first resin, and
b. a resin-only constituent consisting essentially of a second resin; and
consolidating, in a mold cavity, the plurality of fiber-bundle-based preforms and the resin-only constituent, wherein most consolidation of the resin-only constituent occurs after the plurality of fiber-bundle-based preforms is consolidated,
wherein the resin-only constituent is positioned in the assemblage so that the resin-only constituent abuts a surface of the mold cavity that forms the cosmetic surface of the fiber-composite part.

BRIEF DESCRIPTION OF THE DRAWINGS

FIG. 3 depicts an assemblage of feed constituents, including two different resin-only constituents, in a mold cavity in accordance with an illustrative embodiment of the present invention.

FIG. 4 depicts a cosmetic part formed from the assemblage of feed constituents in the mold cavity in FIG. 3.

DETAILED DESCRIPTION

Figure 1:
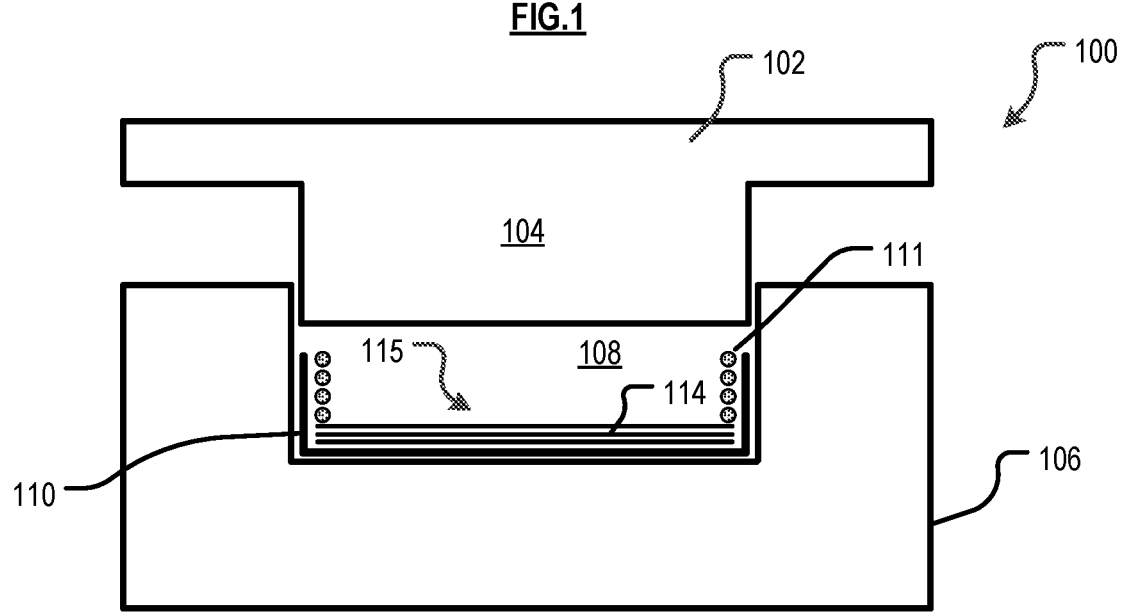
FIG. 1 depicts an assemblage of feed constituents, including a resin-only constituent, in a mold cavity in accordance with an illustrative embodiment of the present invention.

The following terms, and their inflected forms, are defined for use in this disclosure and the appended claims as follows:

"Fiber" means an individual strand of material. A fiber has a length that is much greater than its diameter. A fiber may be classified as being "continuous." Continuous fibers have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters (mm), fibers having a length of about 60 mm or more would be considered "continuous fibers" for that mold. A fiber having a length of 20 mm, if intended to reside along the same long axis of the mold, would not be "continuous." Such fibers are referred to herein as "short fibers." Short fiber, as the term is used herein, is distinct from "chopped fiber," as that term is typically used in the art. In the context of the present disclosure, all fibers, regardless of length, will be sourced from preforms. And substantially all of the (typically thousands of) fibers in a preform are unidirectionally aligned. As such, all fibers, regardless of length and regardless of characterization as "continuous" or otherwise, will have a defined orientation in the preform layup or preform charge in the mold and in the final part. Chopped fiber, as that term is used in the art, refers to fibers that, in addition to being short, have a random orientation in a mold and the final part.

"Fiber bundle" means plural (typically multiples of one thousand) co-aligned fibers.

"Tow" means a bundle of unidirectional fibers, ("fiber bundle" and "tow" are used interchangeably herein unless otherwise specified). Tows are typically available with fibers numbering in the thousands: a 1K tow (1000 fibers), 4K tow (4000 fibers), 8K tow (8000 fibers), etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, co-aligned, resin-impregnated fibers. The segment is cut to a specific length, and, in many cases, will be shaped (e.g., bent, twisted, etc.) to a specific form, as appropriate for the specific part being molded. Preforms are usually sourced from towpreg (i.e., the towpreg is sectioned to a desired length), but can also be from another source of plural co-aligned, unidirectionally aligned fibers (e.g., from a resin impregnation process, etc.). The cross section of the preform, and the fiber bundle from which it is sourced, typically has an aspect ratio (width-to-thickness) of between about 0.25 to about 6. Nearly all fibers in a given preform have the same length (i.e., the length of the preform) and, as previously noted, are co-aligned. The modifier "fiber-bundle-based" or "aligned fiber" is often pre-pended, herein, to the word "preform" to emphasize the nature of applicant's preforms and to distinguish them from prior-art preforms, which are typically in the form of tape, sheets, or shapes cut from sheets of fiber. Applicant's use of the term "preform" explicitly excludes any size of shaped pieces of: (i) tape (typically having an aspect ratio, as defined above, of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based/aligned fiber) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the hybrid/preforms are only partially consolidated (lacking sufficient pressure and possibly even sufficient temperature for full consolidation). By way of example, whereas a compression-molding process is typically conducted at about 1000-3000 psi (which will typically be the destination for a preform charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"Preform Layup" means an arrangement of individual preforms that are placed in a mold cavity. A preform layup is distinguished from a preform charge, wherein, for the latter, the preforms are at least loosely bound to one another.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"About" or "Substantially" means +/−20% with respect to a stated figure or nominal value.

Embodiments of the invention enable the fabrication of cosmetic parts with no sacrifice in the part's mechanical performance, and fabricated in a single compression-molding sequence and without any post processing of cosmetic surfaces. As previously noted, this is accomplished via the incorporation of a resin-only constituent into a preform charge or preform layup.

The material and form factor of the resin-only constituent are critical to forming the cosmetic surface layer, in addition to the appropriate selection of processing parameters of the molding process.

The (cosmetic) surface-layer resin (i.e., the resin-only constituent), and the matrix resin of the underlying composite material (e.g., from the fiber-bundle-based preforms, etc.), can be the same, similar, or dissimilar to one another, provided certain criteria are met. Consider, for example, that two different polymers can form: (i) miscible blends, (ii) compatible immiscible blends, and (iii) incompatible immiscible blends with one another. Most polymers form incompatible, immiscible blends with each other. This means they remain chemically distinct, and the resulting heterogeneous blend has two glass-transition temperatures. Compatible, immiscible blends, which result from strong ionic or van der Waals forces between the polymers, create a polymer blend that is macroscopically uniform. Miscible polymers, such as (a) polyphenylene oxide (PPO) and polystyrene (PS), or (b) polyethylene terephthalate (PET) and polybutylene terephthalate (PBT), blend with each other to create a single-phase structure with only one glass-transition temperature.

For use in conjunction with the invention, the surface-layer resin and the matrix resin are advantageously either miscible blends or compatible immiscible blends. In some embodiments in which miscible polymer blends are used, the surface-layer resin is doped with additives to alter its behavior relative to the matrix resin (or vice versa). The chemical behavior remains the same, but the additive provides, for example, a viscosity differential. As described further below, it is important in terms of processing to have a viscosity differential between the surface-layer resin and the matrix resin.

Although the surface-layer resin and the matrix resin may be different, they should have "overlapping" melt-temperature profiles. In this context, "overlapping" means that one of polymer resins will not combust, off-gas, or otherwise degrade before the other melts, lest a suboptimal part result. Most commercial polymers have a large melt-temperature range, thereby providing the requisite overlap and enabling use of many different combinations of polymers in conjunction with embodiments of the invention.

Furthermore, as required, the resulting resin strata (i.e., the resulting matrix and the resulting surface layer) can have varying properties. For example, a given cosmetic part could have a surface layer of high viscosity TPU dyed blue, and a matrix resin of low viscosity PC of natural color. This can be accomplished based on the respective formulations and additives of the surface-layer resin and the matrix resin. The selection and use of such formulations and additives, to achieve various final properties, are within the capabilities of those skilled in the art.

Once the material of the resin-only constituent is selected, its form factor is next determined. Aesthetic surface geometry of relevant applications can vary greatly, so the geometry of the resin-only constituent will vary accordingly. Depending on the surface geometry, various methods are used based on their suitability for producing a resin-only constituent having the necessary shape. These include, without limitation, (i) thermoforming, (ii) 3D printing, and (iii) filament extrusion.

All three production methods yield a resin-only constituent that is incorporated into the preform charge or preform layup. Such elements are positioned in the charge/layup such that they will abut and span the mold surface(s) designated as cosmetic (i.e., having cosmetic specifications). The thickness of the resin-only constituent can vary between about 0.1 to about 5.0 millimeters. It is notable that the thickness of the resin-rich layer formed on the part to create the cosmetic surfaces will be very close to thickness of the resin-only feed constituent, at least in embodiments in which the resin-only constituent is formed via thermoforming or 3D printing. When the resin-only constituent is a plurality of filament extrusion subunits, there will be relatively more consolidation taking place than if the resin-only constituent were thermoformed or 3D printed, so there will a somewhat greater change in thickness between the resin-only constituent and the resin-rich layer.

For relatively simple geometries, thermoforming is used to form a film of resin into the shape of the cosmetic/aesthetic surface(s). As the complexity of the surface-geometry increases, 3D printing is better suited to producing the shape of the resin-only constituent. For high-volume applications, filament extrusion can be used to produce resin-only filament, which is then formed into subunits, such as by cutting and in some cases bending. The subunits are then incorporated across the relevant surface(s) of the preform charge or preform layup.

To ensure that the position of the resin-only constituent is maintained on relevant surfaces during compression molding (i.e., does not flow away from the surfaces), specific compression-molding process parameters have been identified by the applicant.

The molding cycles defined by such parameters promote (i) differential viscosity and (ii) differential consolidation between resins in order to limit undesired flow. In embodiments in which resin formulations and additives are used to increase or decrease resin viscosity, the selection of optimal process parameters can facilitate a further differential between the behavior of the two resins, as required to establish the two resin strata (i.e., internal part matrix versus cosmetic surface layer). In some other embodiments, process parameters alone are used to limit undesired flow.

In particular, in some embodiments, the surface resin is kept at a viscosity that is higher than that of the matrix resin using a temperature differential. That is, the surface of the mold half proximal to the cosmetic surface is kept at a lower temperature than the surface of the mold half that is proximal to non-cosmetic surface(s). By keeping the resin-only constituent at a lower temperature, and thus a higher viscosity, it will be minimally displaced (i.e., it's tendency to flow is reduced to a practical minimum) from the cosmetic surface during processing. This technique can be used to create a viscosity differential even when the surface resin and the matrix resin are the same.

In addition, differential consolidation limits the flow of the resin-only constituent away from cosmetic surfaces. Differential consolidation is achieved by increasing pressure within the mold while the matrix resin is at a higher temperature (and high enough to cause melt flow of the matrix resin) than the surface-layer resin. Due to the resin-only constituent's higher viscosity (by virtue of being at a lower temperature, inherent properties, and/or additives), and by virtue of the fact that it is in the form of a relatively thin (and fiber-free) layer that is well distributed (at least for thermoformed and 3D-printed elements), most consolidation during molding occurs in conjunction with the matrix-resin. As long as the composite feed (fibers/matrix resin) is consolidated while at a viscosity lower than that of the resin-only constituent, the resin-only constituent will be minimally displaced from the cosmetic surface. Once the composite feed constituents are consolidated, pressure is again increased, as is the temperature if necessary to achieve melt flow of the resin-only constituent, to complete the consolidation of the higher-viscosity, resin-only constituent into the appropriate shape.

Consolidation involves a reduction in volume as void space is removed from feed constituents. In the case of a plurality of fiber-bundle-based preforms, the reduction can be quite significant, and involves not just the removal of void space in an individual preforms, but void space between adjacent preforms (i.e., consider that a plurality of preforms with a substantially circular cross section can be packed together only so tightly). So for a plurality of fiber-bundle-preforms, the volume change from pre-molding to post molding may be over 200%.

It is notable that in some embodiments, during the first consolidation, most consolidation of the matrix resin occurs and a minor amount of consolidation of the resin-only constituent occurs. In such embodiments, during the second consolidation, some minor amount of additional consolidation of the matrix resin will occur along with the major amount of consolidation of the resin-only constituent. For example, in the first consolidation, fiber-bundle-based preforms and any other "matrix-" bearing feed constituents may be 90-percent consolidated and the resin-only constituent(s) may be only 5-percent consolidated. In the second consolidation, the remaining consolidation of the fiber-bundle-based preforms and any other "matrix" bearing feed constituents occurs, along with the remaining (95 percent) consolidation of the resin-only constituent(s).

More generally, greater than 50 percent, and more typically greater than 75 percent, and most typically greater than 90 percent of the consolidation of any "matrix-resin" bearing feed constituents will occur in the first consolidation, and greater than 75 percent, and more typically greater than 85 percent, and most typically greater than 90 percent of the consolidation of resin-only constituent(s) will occur in the second consolidation. As previously indicated, a reference to an amount of consolidation or to the extent of consolidation, as a percentage, means a percentage, by volume, with respect to "full" consolidation. So "greater than 50-percent consolidation of any matrix-bearing feed constituents," for example, means that as compared to the amount of volume reduction expected at full consolidation, the volume of all matrix-bearing feed constituents is collectively reduced by more than 50 percent.

The applied pressure during compression molding is usually in the range of about 500 psi to about 3000 psi, and temperature, which is a function of the particular resins being used, is typically in the range of about 150° C. to about 400° C. Once the applied heat has increased the temperature of the matrix resin above its melt temperature, it is no longer solid and will flow. The matrix resin will then conform to the mold geometry under the applied pressure. Elevated pressure and temperature are typically maintained for a few minutes in accordance with compression molding protocols. As previously noted, the resin-only constituent is maintained, to the extent possible, at a lower temperature than the matrix resin. After the aforementioned dwell at temperature and pressure, a "second" consolidation is conducted, wherein the temperature of the resin-only constituent is raised above its melt temperature. Pressure is maintained or further increased as necessary to consolidate the resin-only constituent. Thereafter, the mold is removed from the source of pressure and is cooled. Once cooled, the finished part is removed from the mold.

Therefore, proper materials selection, form factor, and processing of the resin-only constituents enable a cosmetic composite part to be produced in a single compression-molding cycle.

FIG. 1 depicts an illustrative embodiment in accordance with the present teachings, wherein feed constituents are disposed in mold 100 for forming a cosmetic part via compression molding, in a single molding operation and with no post processing to create the cosmetic surface(s) of the part. The finished cosmetic part—mobile phone enclosure 200—is depicted in FIG. 2.

Figure 2:
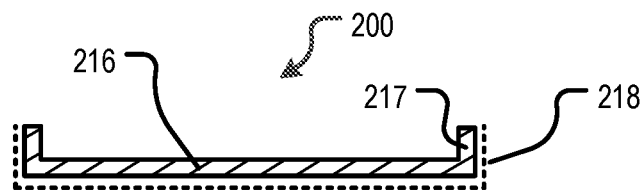
FIG. 2 depicts a cosmetic part formed from the assemblage of feed constituents in the mold cavity shown in FIG. 1.

Referring now to FIGS. 1 and 2, which are cross-sectional views, mold 100 includes male mold half 102 having plunger 104, and female mold half 106 including cavity 108. The feed constituents are organized in mold cavity 108 as assemblage 115. The assemblage includes resin-only constituent 110, preforms 111, and plural plies of composite tape or sheets 114.

Plies 114 will form flat planar back 216 of enclosure 200 and preforms 111 will form perimeter rib 217. Resin-only constituent 110 creates cosmetic surface layer 218 on the exterior surface of back 216 and rib 217. Cosmetic surface layer 218 conceals any otherwise visible fibers in back 216 and rib 217.

Preforms and Plies. Each preform 111 is a segment of plural, co-aligned resin-impregnated fibers. The thermoplastic resin in preforms 111 is the resin that has been previously referred to as "matrix resin," since it is the resin that will form the matrix of the finished part. Applicant uses such fiber-bundle-based preforms, to the extent possible, since they provide an unprecedented ability to align fibers in a finished part with the anticipated stress vectors therein, based on expected in-use loading conditions for the part. Such alignment results in superior part mechanical properties. Thus, the co-aligned fibers in rib 217 will result in excellent mechanical properties for the rib and the enclosure 200.

Each preform 111, like the spool of towpreg or the impregnation-line output from which it is sourced, include thousands of co-aligned, resin-infused fibers, typically in multiples of one thousand (e.g., 1k, 10k, 24k, etc.). A preform may have any suitable cross-sectional shape (e.g., circular, oval, trilobal, polygonal, etc.), although circular/oval geometries are most common.

The individual fibers in the fiber bundles can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

Any thermoplastic resin that bonds to itself under heat and/or pressure can be used. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

Preforms 111 may be added one-by-one to mold cavity 108, forming a "lay-up." For a variety of reasons (most notably for both process efficiency as well a substantially greater likelihood that the desired preform alignment is maintained), in some embodiments, rather than adding preforms individually to a mold, the preforms are grouped and tacked together prior to placement in a mold, and then placed in the mold cavity en masse. This grouping of preforms is referred to herein as a "preform charge." The preform charge is typically a three-dimensional arrangement of preforms, which is usually created in a fixture separate from the mold, and which is dedicated and specifically designed for that purpose. To create a preform charge, preforms are placed (either automatically or by hand) in a preform-charge fixture. By virtue of the configuration of the fixture, the preforms are organized into a specific geometry and then bound together, such as via heating and minimal applied pressure. The shape of the preform charge usually mirrors that of the intended part, or a portion of it, and, hence, the mold cavity (or at least a portion thereof) that forms the part. See, e.g., Publ. Pat. Apps US2020/0114596 and US2020/0361122, incorporated herein by reference.

As compared to a final part in which fibers/resin are fully consolidated, in a preform charge, the preforms are only partially consolidated. This is because there is insufficient pressure, and possibly even insufficient temperature for full consolidation. By way of example, whereas applicant's compression-molding processes are often conducted at a pressure of thousands of psi, the downward pressure applied to the constituents to create a preform charge in accordance with the present teachings is typically in the range of about 10 psi to a few hundred psi. Thus, voids remain in a preform charge, and, as such, the preform charge cannot be used as a finished part.

Although only partially consolidated, the preforms in the preform charge will not move, thereby maintaining the desired geometry and the specific alignment of each preform in the assemblage. This is important for creating a desired fiber alignment in the mold, and, hence, in the final part.

Thus, for use in conjunction with embodiments of the present invention, preforms, as well as other feed constituents, may be organized as a "layup," a "preform charge," or both, as suits the particular embodiment.

Composite plies 114 include fibers, such as any previously referenced, in a thermoplastic resin, such as any previously referenced. The thermoplastic resin in plies 114 is typically the same as that in preforms 111. The form factor of plies 114 is different than that of preforms 111. Plies 114, either as tape or a sheet, are considerably "flatter" than preforms 111. That is, whereas preforms have an aspect ratio, defined as width-to-thickness of about 0.25 to 6, and more typically close to 1 (in the case of a circular cross section), tape has an aspect ratio of between about 10 to about 30, and sheets have an aspect ratio far greater than tape. Typically, fibers run unidirectionally (0°) in tape, but may run unidirectionally (0°), or in two directions (typically 0° and 90°) in sheets. There is a severely constrained ability to align tape and sheets with anticipated stress vectors in a finished part; these form factors are typically used by applicant when creating rib-and-sheet parts, such as the case for a cell phone enclosure.

Resin-only constituent. As previously noted, a resin-only constituent, such as resin-only constituent 110, is suitably selected from any of a wide variety of resins, such as those previously referenced. The production method of the resin-only constituent varies based on its intended geometry. In the embodiment depicted in FIG. 1, wherein the cosmetic surface has a simple form factor, thermoforming is used to create resin-only constituent 110, in known fashion.

As previously discussed, the aforementioned feed constituents (plies 114, preforms 111, and resin-only constituent 110) are subjected to compression molding, as modified in accordance with the present teachings to promote differential viscosity and differential consolidation as between the matrix resin (i.e., the resin in plies 114 and in preforms 111) and the resin in resin-only constituent 110. In this embodiment, the matrix resin and the surface resin are assumed to be the same, so it is particularly important to control compression molding parameters, as previously discussed, to promote differential viscosity and differential consolidation.

The result of the compression molding cycle is finished cosmetic part 200. As depicted via cross section in FIG. 2, finished cosmetic part 200 has cosmetic surface layer 218 covering the exterior surface of its back 216 and rib 217.

FIG. 3, showing a cross-sectional view of feed constituents in mold 300, and FIG. 4, showing a cross-sectional view of finished cosmetic part 400 formed therefrom, depict another embodiment in accordance with the present teachings.

Mold 300 includes male mold half 302 having plunger 304, and female mold half 306 including cavity 308. The feed constituents are organized in mold cavity 308 as assemblage 315. The assemblage includes resin-only constituent 320, plural resin-only constituents 322, and fiber-bundle based preforms 311.

In this embodiment, the complexity of cosmetic surface 424A of finished part 400 are prohibitive to thermoforming. This is specifically attributable to the aspect ratio and sharp edges of the indicated surfaces. Consequently, resin-only constituent 320, which forms the cosmetic surface 424A, is 3D printed. The other cosmetic surface—cosmetic surface 424B—is formed from resin-only constituents 322, which are plural segments of resin filaments. Resin-only constituents 322 are positioned in assemblage 315 along the appropriate portion of the mold surface.

In this embodiment, the matrix resin and the two surface resins are all dissimilar. For example, 3D-printed resin-only constituent 320 is made from high-viscosity TPU (thermoplastic polyurethane), resin-only constituents 322 are high-viscosity PC (polycarbonate), and preforms 311 consist of glass fibers impregnated with a low-viscosity PC resin.

As appropriate, a resin-only constituent(s) may be integrated into a preform charge. For example, the form factor of resin filaments, as a resin-only constituent, facilitates incorporation into a preform charge along with the nominal constituent (i.e., the fiber-bundle-based preforms). As such, in some embodiments, the assemblage includes a preform charge consisting of fiber-bundle-based preforms 311, whereas resin-only constituents 320 and 322 are separately placed in the mold cavity. In some other embodiments, the assemblage includes a preform charge consisting of fiber-bundle-based preforms 311 and resin-only constituents 322, whereas resin-only constituent 320, which is 3D-printed, is placed in the mold cavity separately form the preform charge. In some further embodiments, all feed constituents are integrated into a preform charge. In still some further embodiments, the feed constituents are added one-by-one as a lay-up to the mold cavity It is to be understood that the disclosure describes a few embodiments and that many variations of the invention can easily be devised by those skilled in the art after reading this disclosure and that the scope of the present invention is to be determined by the following claims.

What is claimed:

1. A method for forming, via compression molding in a single molding operation, a fiber-composite part having at least one cosmetic surface, wherein the cosmetic surface is formed without post processing, the method comprising:
    forming an assemblage of feed constituents, wherein the assemblage includes:
    a. a plurality of fiber-bundle-based preforms, each preform comprising a plurality of fibers infused with a first resin, and
    b. a resin-only constituent consisting essentially of a second resin; and
    compression molding and thereby consolidating, in a mold cavity, the plurality of fiber-bundle-based preforms and the resin-only constituent, wherein the resin-only constituent is positioned in the assemblage so that the resin-only constituent abuts a surface of the mold cavity that forms the cosmetic surface of the fiber-composite part, and wherein consolidating comprises:
    a. a first consolidation, including:
        (i) increasing a temperature of the fiber-bundle-based preforms to reach melt-flow of the first resin, while maintaining a temperature of the resin-only constituent below a temperature required to achieve melt flow of the second resin; and
        (ii) increasing pressure in the mold cavity sufficient for greater than 50 percent consolidation of the fiber-bundle-based preforms but 25 percent or less consolidation of the resin-only constituent; and
    b. a second consolidation, including:
        (i) increasing a temperature of the resin-only constituent to reach melt-flow of the second resin; and
        (ii) increasing pressure in the mold cavity sufficient to complete consolidation of the resin-only constituent and the fiber-bundle-based preforms.

2. The method of claim 1 wherein consolidating comprises creating a difference in viscosity between the first resin and the second resin.

3. The method of claim 2 wherein creating the difference in viscosity between the first resin and the second resin comprises maintaining a temperature of the second resin lower than a temperature of the first resin during consolidation of the fiber-bundle-based preforms.

4. The method of claim 3 wherein consolidating comprises applying sufficient pressure to consolidate the plurality of fiber-bundle-based preforms while the temperature of the second resin is lower than the temperature of the first resin.

5. The method of claim 2 wherein creating a difference in viscosity comprises adding a viscosity modifier to the first resin that decreases a viscosity of the first resin relative to the viscosity thereof in the absence of the viscosity modifier.

6. The method of claim 2 wherein creating a difference in viscosity comprises adding a viscosity modifier to the second resin that increases a viscosity of the second resin relative to the viscosity thereof in the absence of the viscosity modifier.

7. The method of claim 1 wherein the first resin and the second resin are the same resin.

8. The method of claim 1 wherein forming the assemblage of feed constituents comprises forming the resin-only constituent via thermoforming.

9. The method of claim 1 wherein forming the assemblage of feed constituents comprises forming the resin-only constituent via 3D printing.

10. The method of claim 1 wherein forming the assemblage of feed constituents comprises forming the resin-only constituent via filament extrusion.

11. The method of claim 1 wherein in the first consolidation, greater than 75 percent consolidation of the fiber-bundle-based preforms occurs.

12. The method of claim 1 wherein in the first consolidation, greater than 90 percent consolidation of the fiber-bundle-based preforms occurs.

13. The method of claim 1 wherein in the first consolidation, 15 percent or less consolidation of the resin-only constituent occurs.

14. The method of claim 1 wherein in the first consolidation, 10 percent or less consolidation of the resin-only constituent occurs.

* * * * *